Nov. 28, 1933.  W. E. SHARP  1,937,253
MANUFACTURE OF NUTS
Filed Feb. 13, 1929   4 Sheets-Sheet 1
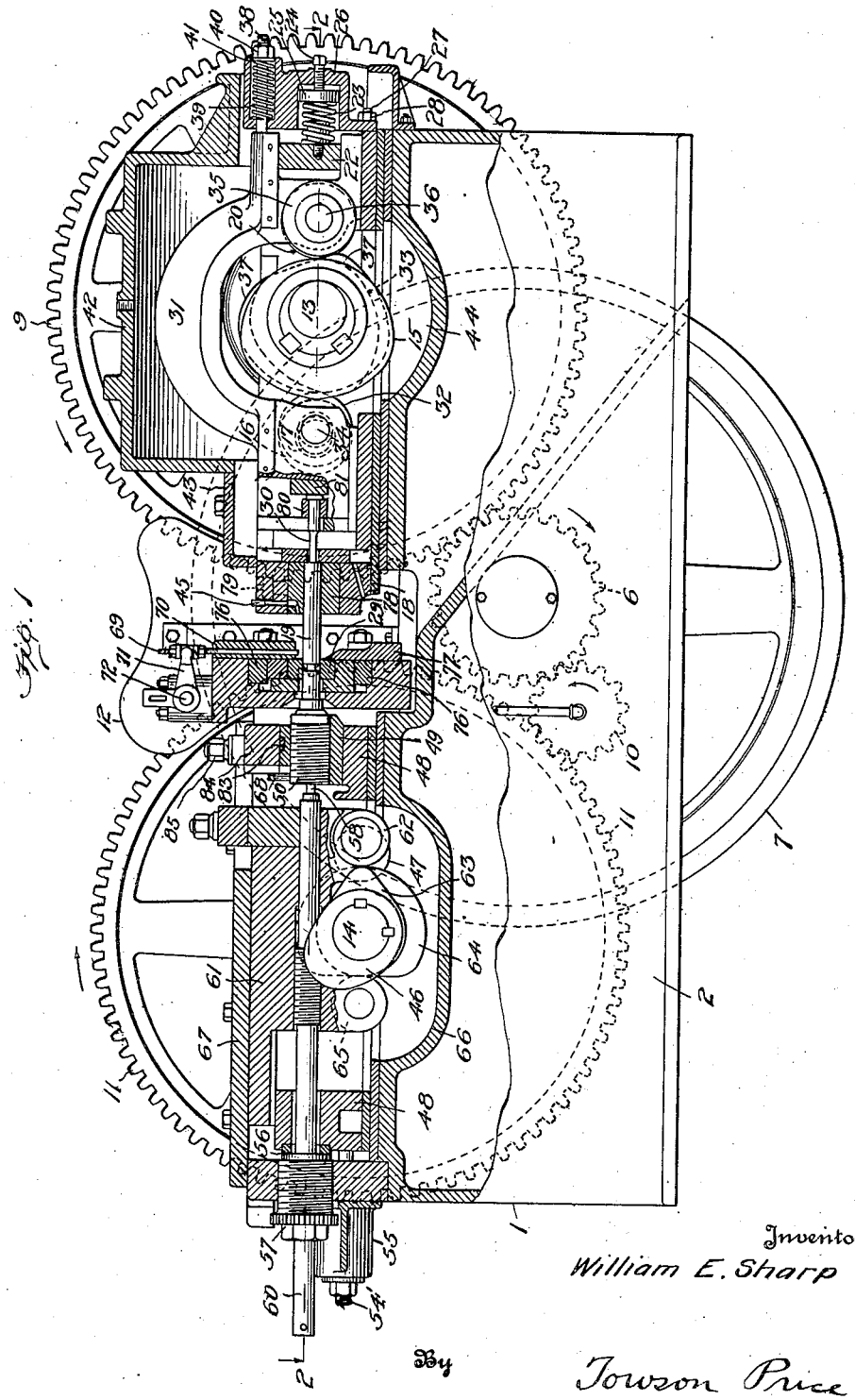
Inventor
William E. Sharp
By Towson Price
Attorney Nov. 28, 1933.        W. E. SHARP        1,937,253
MANUFACTURE OF NUTS
Filed Feb. 13, 1929        4 Sheets-Sheet 2
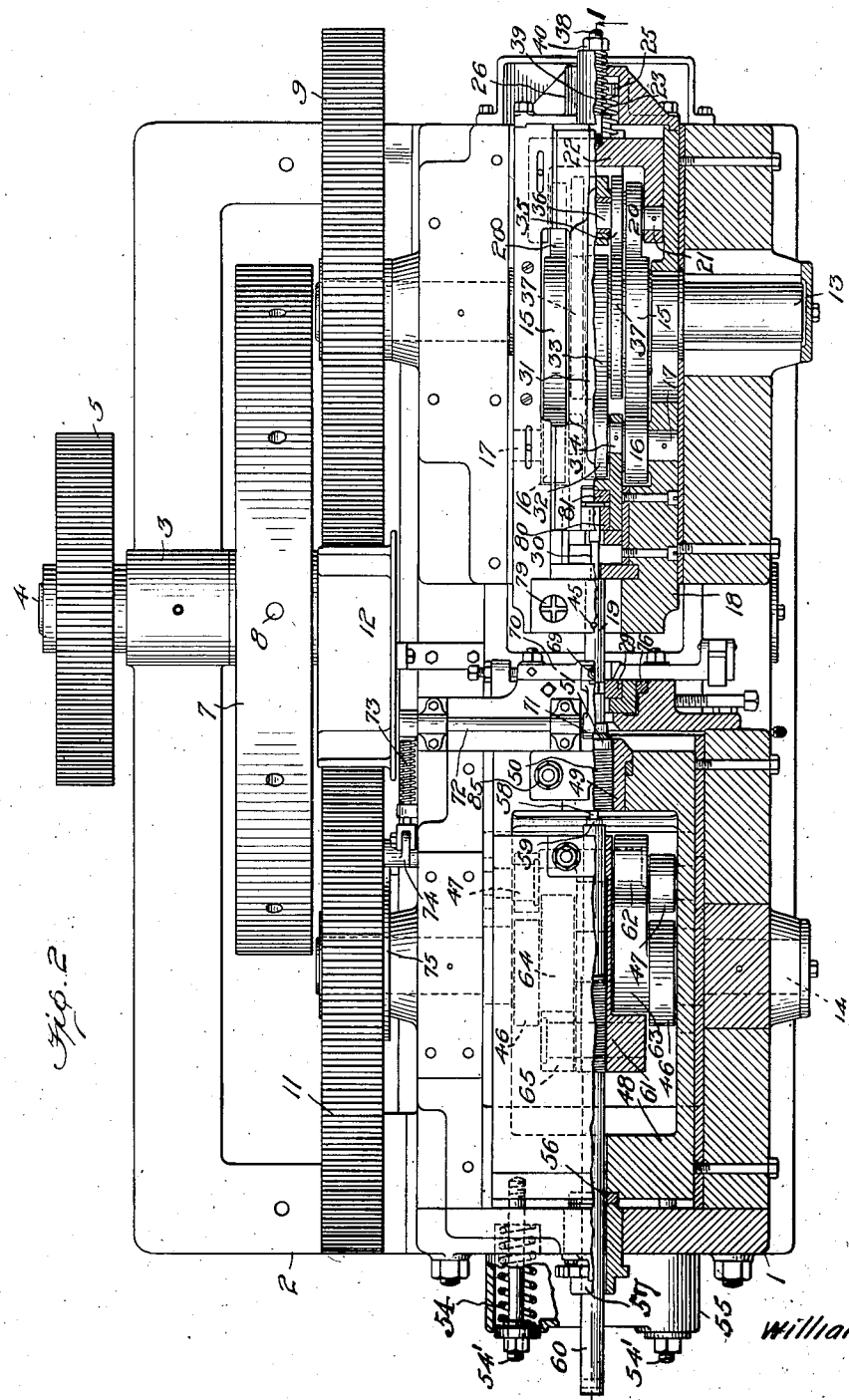

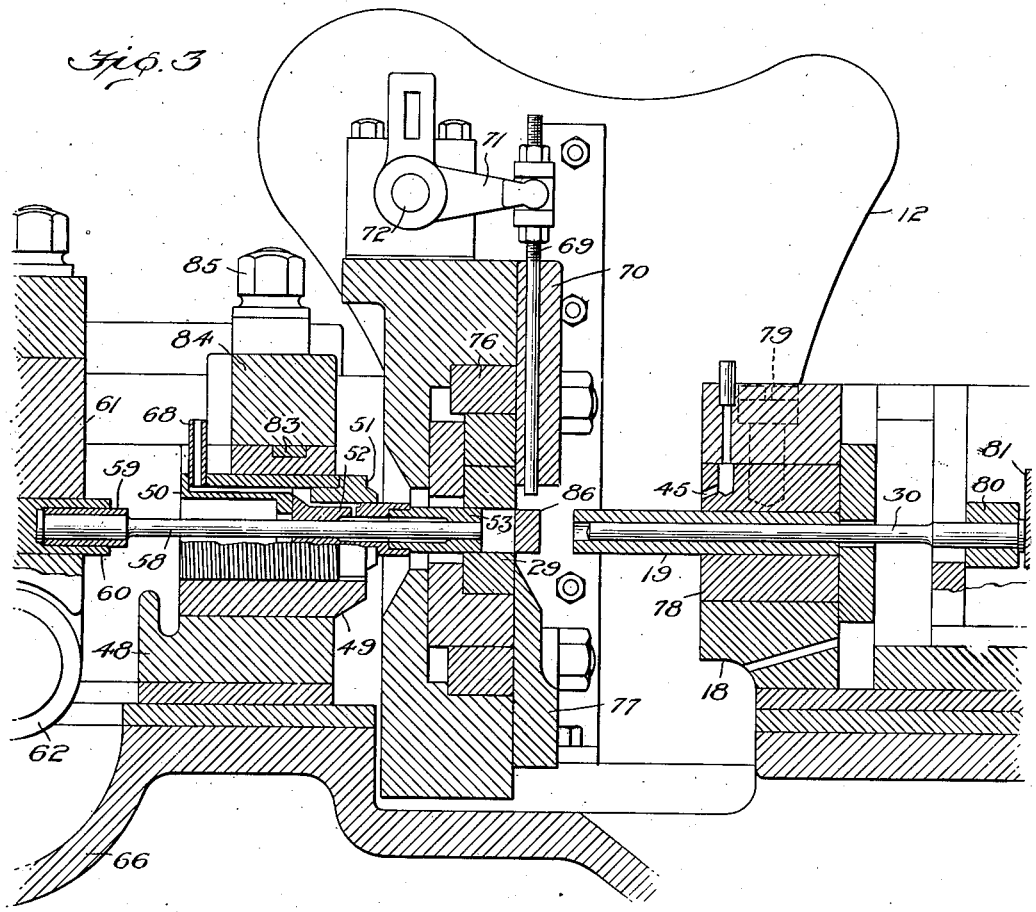
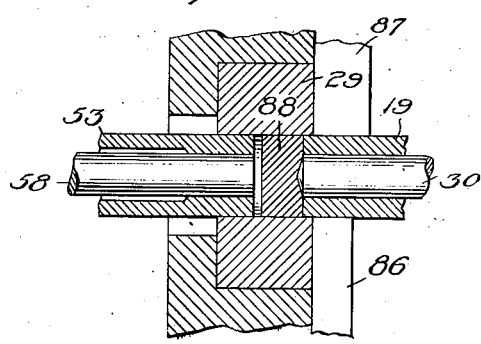
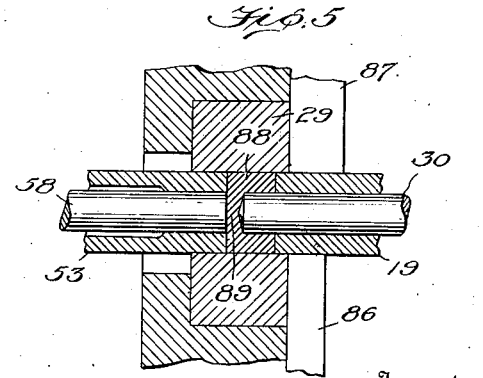

Nov. 28, 1933.  W. E. SHARP  1,937,253
MANUFACTURE OF NUTS
Filed Feb. 13, 1929   4 Sheets-Sheet 4

Inventor
William E. Sharp
By Towson Price
Attorney

Patented Nov. 28, 1933

1,937,253

UNITED STATES PATENT OFFICE 1,937,253

MANUFACTURE OF NUTS

William E. Sharp, Chicago, Ill.

Application February 13, 1929. Serial No. 339,701

13 Claims. (Cl. 10—78)

The present application is a continuation in part of my application Serial No. 723,231, filed June 30, 1924, for Process of and means for manufacturing nut blanks, now Patent No. 1,794,737, of March 3, 1931, and the division thereof, Serial No. 242,664, filed December 27, 1927.

This invention relates to nut making machinery and more particularly to a machine for swaging nut blanks from stock of a thickness less than that of the finished blanks.

The principal object of my invention, generally considered, is to provide a method and apparatus for manufacturing nut blanks involving a crowner, a piercer, a cut-off tool and a swaging tool operating coaxially in a die chamber for cutting off, swaging and finishing pieces of hot metal to form nut blanks and minimize the formation of scrap.

Another object of my invention is to provide a method for making nut blanks in which a heated flat bar, somewhat less in thickness than the finished blank, is used and fed manually to alignment with a stationary die chamber to an adjustable bar stop, a cut-off punch, actuated in any desired manner as by means of cams, being moved to and into the die chamber, thereby severing that portion required to be formed into a nut blank from the parent bar, the severed blank being forced into the die, the other end of which is closed by a crowning tool and piercer operating therein, a swaging punch then operating in the cut-off tool to advance nearly through the piece of hot metal to expand said metal to fill the die chamber, said swaging punch being then withdrawn, the piercer advanced to complete the hole through the blank, the cut-off tool moved a slight distance farther into the die chamber to compress pierced blank to its finished thickness, said cut-off tool then receding to its former position, the swaging punch being retracted and permitting the web or piece of scrap severed by the piercer to enter the cut-off tool as the said piercing tool is forced through the blank.

A further object of my invention is to provide a method of making nut blanks, as previously described, in which the piercing tool, after forcing the severed web or piece of scrap into the cut-off tool, recedes as the cut-off tool is withdrawn from the die chamber followed by the crowning tool which ejects the finished blank from the die chamber, said crowning tool then receding to its former position for receiving another hot piece of metal, the swaging punch operating in the cut-off tool as the latter is withdrawn from the die to eject the severed web or punching from within the cut-off tool, said swaging punch moving outwardly and extending beyond the end of the cut-off tool to the extent used for the swaging operation in order to provide for cooling of the end.

A still further object of my invention is to provide a machine for performing the method previously described and operating the crowner, piercer, swaging punch and cut-off tool toward and away from the die box in the desired manner as by means of cams supplemented in some instances by springs to act on a manually fed bar of hot metal to cut-off, swage, pierce, finish, and eject nut blanks efficiently and rapidly, said blanks being square, hexagonal or of desired form in accordance with requirements.

Other objects and advantages of the invention relating to the particular arrangement and construction of the various parts will become apparent as the description proceeds.

Referring to the drawings illustrating my invention, the scope whereof is defined by the appended claims.

Figure 1 is a partial elevational and partial longitudinal sectional view on the line 1—1 of Figure 2, looking in the direction of the arrows.

Figure 2 is a partial plan and partially horizontal sectional view on the line 2—2 of Figure 1, looking in the direction of the arrows.

Figure 3 is a fragmentary sectional view on an enlarged scale, showing the central portion of the nut machine or that portion adjacent the die and tools operating therein, said tools being shown in starting position, that is, with a hot bar of metal in place, but before a piece has been cut-off by the cut-off tool, the section being taken on the line 1—1 of Figure 2, looking in the direction of the arrows.

Figure 4 is a fragmentary view corresponding to Figure 2 but showing the die and those portions of the nut making tools adjacent thereto, said tools being in the position just subsequent to that shown in Figure 3 where the cut-off tool has just severed a piece of hot metal from the parent bar and forced it into the die.

Figures 5 to 11 inclusive are views corresponding to Figure 4 but showing succeeding positions of the crowner, piercer, cut-off and swaging tools with respect to the die and piece of metal operated on.

Figure 12:
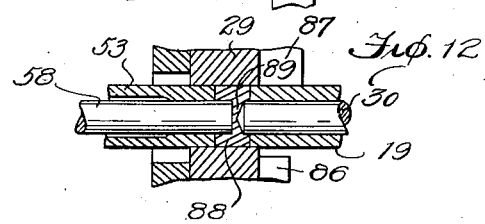

Fig. 12 is a view corresponding to Fig. 5 but illustrating one position of the tools in practicing a modified form of my invention.

Referring to the drawings in detail, like parts being designated by like reference characters, there is shown one embodiment of my nut making machine 1, comprising a base casting 2 provided with a bearing 3 in which is journaled a shaft 4 carrying a gear 5 and a gear 6. The gear 5 may mesh with a corresponding gear on an electric motor (not shown) or other prime mover for driving the machine. Mounted on the shaft on the other side of the bearing 3 is a fly wheel 7 for insuring uniform operation of the machine. The periphery of the fly wheel is preferably formed with a series of apertures or pockets 8 adapted to receive a bar for manually turning the wheel.

The gear 6 preferably meshes with the main cam operating gear wheel 9 and, through an idler gear 10, simultaneously serves to drive the other main cam operating gear wheel 11. A gear guard 12 is preferably provided between and above the gear wheels 9 and 11 to minimize danger to an operator. The driving motor or prime mover preferably turns the gear 5 in such a direction that the gear wheel 9 turns counter-clockwise as viewed in Figure 1 and the gear wheel 11 turns clockwise as viewed in said figure. The gear wheel 9 is mounted on a shaft 13 turning in suitable bearings provided in the frame 2 and the gear wheel 11 is likewise mounted on a shaft 14 turning in suitable bearings in said frame.

We will first consider the operation of the right hand side of the machine, that is, the cams and tools operated through turning of the gear wheel 9. The shaft 13 of the gear wheel 9 carries a pair of cut-off cams 15 which engage forward cam rollers 16 mounted on pins 17, held in the cut-off ram 18, mounted for longitudinal reciprocation in the main or base casting 2. Said rollers through the engagement of the cams 15 therewith serve for moving the ram 18 forward to reciprocate the connected cut-off tool 19 and cause it to cut-off pieces of hot metal from a parent bar and form such in cooperation with the other tools, to be hereinafter described, to produce nut blanks. The cut-off ram 18 is retracted by engagement of the cams 15 with the return rollers 20 which are mounted on roller pins 21 held in a spring roller block 22 resiliently connected to the cut-off ram by means of a spring 23 which is adjustable, as by means of a screw 24 operating against a thrust block 25, said screw and block being mounted in a spring case 26 connected to the cut-off ram in any desired manner, as by means of stud bolts 27 and nuts 28.

It will therefore be seen that the cut-off tool 19 is positively operated forwardly into the associated die or die box 29 by the cams 15 and rollers 16 mounted in the cut-off ram 18 in which the cut-off tool is mounted. The return operation is effected by the same cams 15, but the operation is not positive but resilient on account of the resilient mounting of the return rollers 20 on the spring roller block 22. This mode of operation avoids the necessity of having different cams for forward and return motion of the cut-off tool, the spring mounting of the return rollers permitting relative longitudinal movement between the forward and return rollers to allow for variation in the horizontal cam diameter.

The swager, ejector, or swaging punch or tool 30 is longitudinally movable in the cut-off tool 19 and mounted in a swaging ram 31 which in turn is mounted to reciprocate longitudinally with respect to the cut-off ram 18 as most clearly shown in Figures 1 and 2. The swaging ram 31 carries a roller 32 for forward operation engaged by the forward actuating cam 33 mounted on the shaft 13, said roller being journaled on a roller pin 34 held in the swaging ram 31. For moving the swaging ram rearwardly to withdraw the swaging punch 30 from the die 29, a pair of return rollers 35 are provided on roller pins 36 in the swaging ram 31 and engaged by a corresponding pair of return cams 37 mounted on the shaft 13. In order to take up any slack and always hold the forward roller 32 against the cam 33, the swaging ram 31 is provided with a swage return spring pin 38 reciprocating in a corresponding aperture and pocket in the spring case 26, a compression spring 39 being mounted thereon and held in adjusted relation with respect thereto by means of a nut 40 and washer 41.

It will therefore be apparent that the swaging punch, as contra-distinguished from the cut-off tool 19, is operated forward by a cam and roller and rearward by other cams and rollers so that the operation is positive in both directions, a spring, however, being provided to take up any possible clearance between the forward cam and its associated roller, so that the forward operation is at all times maintained positive and accurate.

In order to keep dust and foreign material out of the mechanism, the rams, cams and rollers previously described are enclosed by means of a cover plate or housing 42, leaving a small portion open adjacent the tools which is preferably covered by a separate cover plate 43, thereby facilitating access to the cut-off and swaging tools. Lubrication of the cams is desirably provided by having an oil well 44 formed in the main casting 2, the level of the oil being maintained high enough so that the cams dip therein at every revolution. Cooling of the cut-off and swaging tools during operation is desirably provided by a duct 45 through which water passes and sprays on the tools.

We will now consider the operation of the left hand side of the machine, that is, the cams and tools operated through turning of the gear wheel 11. The shaft 14 of the gear wheel 11 carries a pair of cams 46 which engage crowner rollers 47 mounted on roller pins secured in the crowner ram 48. Said ram is mounted for longitudinal reciprocation in the main frame 2 in a manner similar to the mounting of the cut-off ram 18 and carries on its forward or inner end a crowner barrel clamp 49, in which is preferably threadably mounted the crowner barrel 50 and the crowner bushing 51. Between the crowner barrel 50 and bushing 51 is secured the crowner shank 52, in the forward or inner end of which is mounted the crowner tip, crowner, or crowning tool 53. Forward movement of the crowner into the die 29 is effected by the cams 46 acting on the rollers 47 and moving the crowner ram 48, rearward movement, however, being effected by compression springs 54 mounted on crowner spring pins 54' extending rearwardly from the crowner ram 48 and enclosed in the crowner spring cover 55. It will therefore be seen that although the crowner is positively operated by cams in a forward direction, it is withdrawn merely by resilient means.

In order to limit the rearward travel of the crowner ram 48, a thrust ring 56 is provided which engages the ram 48 at the outermost limit of its travel and is held in adjusted position by means of an adjusting nut 57. It will be seen, therefore, that positive stop means are provided to hold the crowner ram and crowner at the outermost limit of their travel, so that the tip of the crowner serves as one wall of the die box 29, while a piece of metal is being swaged therein to form a nut blank.

The piercer, piercing tool, or slug ejector 58 is mounted in a piercer sleeve 59, which in turn fits in a piercer bar 60. The outer end of the bar passes through the adjusting nut 57 and crowner thrust ring 56 and the piercer proper is adapted to reciprocate in the crowner tip 53. The piercer bar is securely mounted in any desired manner as by threading in the piercer gripper block or ram 61 which is mounted for longitudinal reciprocation inside of the crowner ram 48. Said block 61 is provided with downward extensions carrying a piercer roller pin upon which is rotatively mounted a roller 62 engaged by the cam 63 on the shaft 14 for forward operation of the piercer.

In order to provide for the return movement of the piercer, a cam 64 is provided on the shaft 14 engaging a piercer return roller 65 mounted on a roller pin set in the piercer ram 61. It will therefore be seen that the piercer is positively operated forward by one cam and associated roller and rearward by a different cam and associated roller. Lubrication of all of the cams on the left hand side of the machine is preferably provided for, as on the right hand side of the machine, by an oil well 66 containing oil at such a level that the cams dip therein during each revolution.

A crowner cover plate 67 is preferably provided to cover the mechanism and exclude dirt and foreign material. As in connection with the right hand side of the machine, a water passageway 68 is provided through the crowner barrel clamp into the crowner tip around the piercer 58 so that the piercer is maintained cool, and when the crowner advances beyond the associated piercer to eject the nut blank, water is sprayed past the tip of the piercer out the innermost end of the crowner to cool the crowner and die.

In order to obviate the possibility of nut blanks sticking on the crowner, when the same is operated to eject them from the die box, an ejector rod 69 is provided for vertical reciprocation in the die clamp plate 70, said rod being desirably operated by an ejector arm 71 adjustably associated therewith and mounted on the nut ejector shaft 72, said shaft being preferably oscillated by a resilient connection 73 to a pivoted lever 74, the lower end of which engages a cam 75 on the shaft 14 which acts to move the lever 74 once during each revolution of the shaft 14 to cause the rod 69 to move downwardly at the proper time and detach, if necessary, the finished nut blank from the crowner tip as the same is ejected from the die 29.

The operation of my nut making machine heretofore described is as follows. The die 29 is clamped in place in the die gripper block 76 by means of clamp plates 70 and 77. The cut-off tool 19 is clamped in position in gripper blocks 78 preferably by means of slotted fillister head cap screws 79. The swager is held in position in the swaging punch block 80 as by means of the wedge 81. The crowner 53 is threadably held in the crowner barrel clamp 49 which is tightened by a crowner yoke 83, clamp block 84 and clamp nuts 85. The piercer 58 is held in place by the piercer sleeve 59 fitting in the rod 60. The parts are adjusted to proper position and the cams provide for the desired movement in accordance with the size of the stock used.

In the present embodiment, a die 29 for making square nut blanks is employed, but it will be understood that I am not limited to making such nut blanks, this description being merely illustrative. The heated generally rectangular bar of metal 86 is fed directly over the right hand end of the die 29, the other end of the die being closed by the crowner and piercer positioned as shown in Figure 3, the cut-off and swaging tools also having the position as illustrated. The hot bar 86, when in proper position, abuts the adjustable bar stop 87.

As the gear wheel and their associated cams rotate, the tools assume the position illustrated in Figure 4, where the cut-off tool 19 has severed a piece of hot metal 88 from the parent bar 86 and forced it into the die 29. It will be noted that the die box provides a space longer than the size of the bar 86 or piece of metal 88 cut therefrom, said space being provided so that the blank can be expanded to a thickness greater than that of the stock by the swaging punch in a manner to be hereinafter described.

Referring now to Figure 5, it will be seen that the swaging punch 30 has advanced into the metal 88, forming a hole approximately two-thirds of the way through the blank and expanded the thickness thereof to fill the die space between the crowner and piercer on the one hand and the cut-off tool on the other leaving a relatively thin web, punching or slug 89 of metal at the end of the swaging punch 30.

Figure 6:
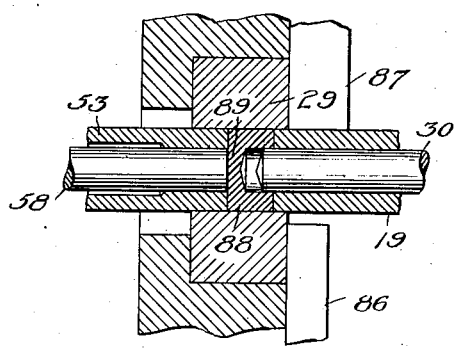

Figure 6 shows the relation, after the swaging tool has started to retreat, while the other tools remain stationary.

Figure 7:
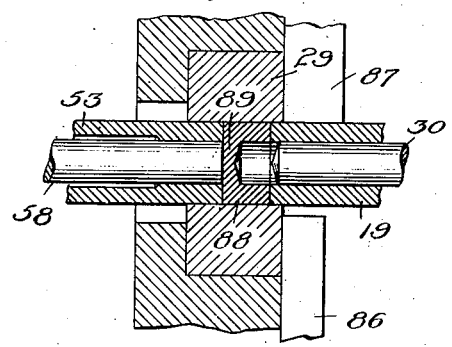

In Figure 7, the swaging punch has further retreated out of the blank 88 while the other tools remain in substantially the same position.

Figure 8:
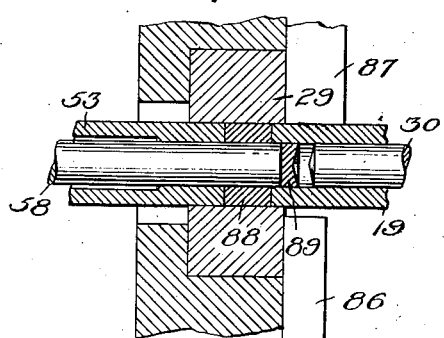

In Figure 8, corresponding in tool position with Fig. 1, the piercer 58 has folowed the swaging punch and forced the slug 89 into the cut-off tool 19, the blank 88, at this point being formed to its finished size by advancing the cut-off tool a slight distance, and then withdrawing it, leaving the blank in condition ready for being ejected. The position of the cut off cams 15 at this point is illustrated in Fig. 1, it being noted that there are slight bulges or bumps on said cams in engagement with the rollers 16, to effect the desired advance of the cut-off tool for the external finishing operation, the piercing tool at this point being in its extreme or fully advanced position extending through the blank, as represented by the position of the piercer advancing cam 63.

Figure 9:
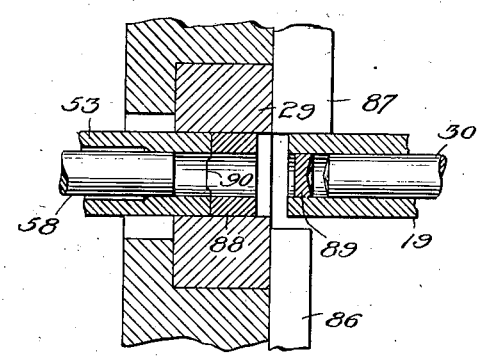

In Figure 9, the piercer has retreated into the crowner to some extent.

Figure 10:
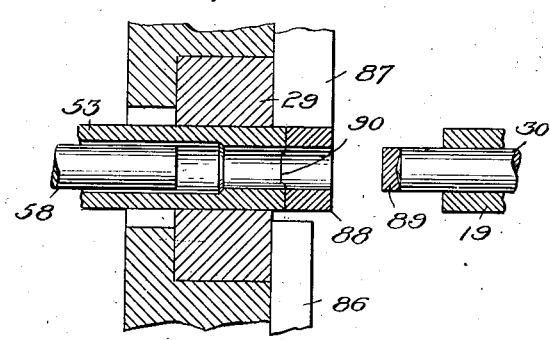

In Figure 10, the swaging punch has ejected the slug 89 from the cut-off tool 19, by rearward movement of the latter over the swaging punch, causing said punch to, in effect, move forwardly with respect to said cut-off tool, while the crowner has advanced to eject the finished blank 88 from the die box leaving the piercer 58 in its inner position. Such movement of the crowner results in uncovering the water passage 68 between the crowner and piercer and permitting water to be sprayed around the piercer and through the crowner to cool the tools to the desired extent.

Figure 11:
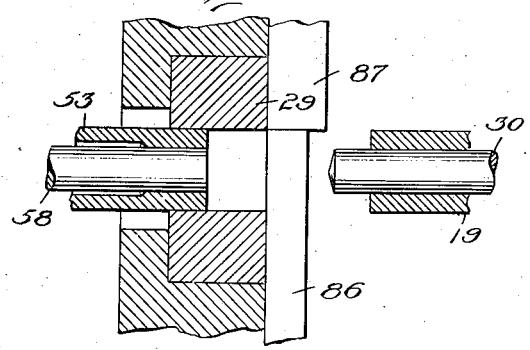

In Figure 11, the crowner has been retracted and the piercer advanced to the position illustrated in Figure 3 so that the bar 86 may again be moved to position against the stop 87 for the performance of another blank-forming operation. In this position, however, it will be seen that the swager still protrudes from the end of the cut-off tool where it is cooled by a stream of water from the water passage 45.

Although the foregoing is a description of a preferred embodiment of my invention, it will be understood that, if desired, the cams 63 and 64 may be so modified that they cause the piercer 58 to act as a swaging tool to the extent of moving into the piece of metal 88 simultaneously with the movement of the swaging tool or ejector 30. The cams 33 and 34 would in that event, of course, be similarly modified to cause a correspondingly less swaging movement of the tool 30. Such a modified operation of the machine is represented sequentially by Figures 3, 4, 12, 8, 9, 10 and 11.

Figure 3, as in the previous embodiment, represents a position where the cut-off tool 19 is about to advance to perform a severing operation on a piece of the stock or parent bar 86.

Fig. 4 represents the tool 19 after it has severed a piece of hot metal 88 from said bar 86 and forced it into the die 29.

Referring now to Figure 12, it will be seen that the material in the nut blank has been swaged by movement of the swaging tool 30 which enters the blank and displaces the material thereof against the walls of the die box 29. In this instance, the tool 30 is assisted by the tool 58 which also acts as a swaging tool as well as a piercer, and moves forwardly in the tool 53 until its end is disposed in close proximity to the convex end of the tool 30, leaving a relatively thin web or slug 89 of metal between the swaging tools 30 and 58. The apparatus is so proportioned that when the tools 30 and 58 occupy the relative positions shown in Fig. 12, the material in the nut blank will fill the interior of the die box 29 and the nut blank will have the desired form.

In Figure 8, the piercer or swaging tool 58 has followed the swaging punch or ejector 30 and forced the slug 89 into the cut-off tool, as in the previous embodiment. In Figure 9, the piercer has retreated into the crowner to some extent, while in Figure 10, the swaging punch has ejected the slug 89 from the cut-off tool 19, while the crowner is advanced to eject the finished blank 88 from the die box.

In Figure 11, the crowner has been retracted and the piercer advanced to the position illustrated in Figure 3, so that the bar of metal 86 may be moved to a position against the stop for the performance of another blank-forming operation.

From the foregoing description taken in connection with the accompanying drawings, it will be seen that I have provided a nut blank making machine which quickly and efficiently forms nut blanks from ordinary stock, forming a crown or ridge 90 thereon, if desired, by the shape of the crowning tool 53, so that such blanks may be subsequently used for making locking nuts. The tools assume a series of typical positions in forming the blank, the bar of hot metal being applied in position against the stop for shearing a blank from the end thereof. In accordance with a preferred form of my invention the blank is then sheared and forced into the die by the cut-off tool, the swaging tool then forces the metal to substantially fill the die, thereby forming a blank of greater thickness than the stock of the bar. The swaging tool then starts to retrace while the cut-off tool advances a small amount to finish the blank. The swaging tool is then followed out of the blank by the piercer which forces the relatively thin slug into the cut-off tool, completely forming the blank ready for being ejected by the crowner. The nut blank is then ejected from the die by the crowner, the ejector rod engaging the blank and detaching it from the crowner, if necessary, while the swaging punch ejects the slug from the cut-off tool, a stream of water at high pressure being applied to the end of the swager to, not only cool the tool, but make sure to knock the slug from the end thereof.

Although I have described preferred embodiments of my invention, and the machine and tools are desirably of the shapes illustrated, it will be understood that modifications may be made therein without departing from the spirit and scope of the following claims.

Having now described my invention, I claim:

1. A nut machine comprising a die, a cut-off tool, a cam and associated rollers for advancing and withdrawing said cut-off tool with respect to the die as required, a swaging punch adapted to reciprocate in said cut-off tool, a cam and associated roller for moving said swaging punch forward and another cam and roller for moving it rearwardly, as desired, a crowning tool, a cam and associated roller for moving said crowning tool forward into said die, a spring for urging said crowning tool rearwardly out of said die when released by turning of the cam, a piercer adapted to reciprocate in said crowning tool, a cam and associated roller for causing said piercer to move forward into said die, and another cam and roller for withdrawing said piercer from said die.

2. A nut machine comprising a frame, a die mounted therein, a cut-off tool, a cam and associated rollers for advancing and withdrawing said cut-off tool with respect to the die as desired, the roller for withdrawing said cut-off tool being resiliently mounted with respect to the other roller, a swager adapted to reciprocate in said cut-off tool, a cam and associated roller for moving said swager forward and another cam and roller for moving it rearward, as desired, a crowner on the other side of the die from the cut-off tool and swager, a cam and associated roller for moving said crowner into said die, a spring for withdrawing said crowner from said die when released by turning of the cam, a piercer adapted to reciprocate in said crowner, a cam and associated roller for causing said piercer to move into said die and another cam and roller for withdrawing said piercer from said die, and a normally closed passage which is uncovered, to admit water to cool said tools, upon predetermined relative movement of the crowner and piercer.

3. A nut machine comprising a frame, a die mounted therein, a ram mounted for reciprocation in said frame, a cut-off tool mounted for actuation into out of said die by said ram, a cam adapted to be rotated for moving said ram back and forth, a swaging ram mounted for reciprocation with respect to said first ram, a swaging punch mounted in said swaging ram and adapted to reciprocate within said cut-off tool, a cam for moving said swaging ram toward said die and another cam for moving it away from said die, a crowner ram mounted for reciprocation with respect to said frame on the other side of said die, a crowner mounted in said ram, a cam for operating said crowner ram to move said crowner into said die, resilient means for urging said ram away from said die when released by said cam, a piercer ram mounted to reciprocate with respect to said crowner ram, a piercer mounted in said ram and adapted to reciprocate within said crowner, a cam for causing said piercer ram to move toward said die, and another cam for moving said ram away from said die.

4. A nut machine comprising a frame, a pair of cam shafts rotatably mounted in said frame, a die mounted intermediate said cam shafts, a cut-off tool and swaging punch mounted to reciprocate coaxially with one another, cams fixed on one of said shafts for simultaneously moving said cut-off tool and swaging punch into and out of said die as desired, a spring retracted crowner and a piercer mounted in said frame to reciprocate coaxially with one another, and cams mounted on the other shaft to cause said crowner to move into and said piercer to move into and out of said die as desired for making nut blanks.

5. A nut machine comprising a frame, a die mounted therein, a cut-off tool, a cam for advancing and withdrawing said cut-off tool with respect to the die as desired, a swager adapted to reciprocate in said cut-off tool, a cam for moving said swager forward and another cam for moving it rearward, as desired, a crowner on the other side of the die, a cam for moving said crowner into said die, resilient means for withdrawing said crowner from said die when released by turning of the cam, a piercer adapted to reciprocate in said crowner, a cam for causing said piercer to move into said die, and another cam for withdrawing said piercer from said die.

6. A nut machine comprising a die, a cut-off tool, a cam for advancing and withdrawing said cut-off tool with respect to the die to cut off a piece of metal from stock and force it into said die, a swaging punch mounted to reciprocate in said cut-off tool, a cam for moving said swaging punch forward to swage said piece of metal in the die after it has been cut off by the cut-off tool, said cam moving the swaging punch forward to nearly pass through said piece of metal but leaving a thin web, another cam for moving it rearwardly into said cut-off tool, a crowning tool, a cam for moving said crowning tool forward into said die, means holding said crowning tool temporarily stationary while the piece of metal in the die is being swaged by the swaging punch, a spring for withdrawing said crowning tool from said die when released by turning of its cam, a piercer mounted to reciprocate in said crowning tool, a cam for causing said piercer to move forward into said die and piece of metal and punch out the thin web of metal formed by the swaging punch and move it into the cut-off tool, and another cam for withdrawing said piercer from said die.

7. A nut machine comprising a frame, a die mounted in said frame, a pair of cam shafts mounted one on either side of said die, a gear wheel on each shaft, gearing for turning said gear wheels simultaneously, tool operating cams on each shaft, cut-off and swaging tools mounted for reciprocation into and out of said die coaxially with each other, crowning and piercing tools mounted for reciprocation into and out of said die at the other side thereof coaxially with each other, means connecting said cut-off tool and swaging tools with the cams on one shaft for operating them as desired, means connecting the crowning and piercing tools with the cams on the other shaft for operating them as desired for manufacturing nut blanks, and spring means, aligned with said cam shafts and associated with said cut-off tool, whereby it is positively advanced into but resiliently withdrawn from said die.

8. A nut machine comprising a frame, a pair of cam shafts rotatably mounted therein, a die mounted in said frame intermediate said shafts, a cut-off tool mounted to reciprocate into and out of said die, spring means aligned with said cam shafts and associated with said cut-off tool, whereby it is positively advanced but resiliently withdrawn from said die, a swaging punch mounted to reciprocate coaxially in said cut-off tool, cams fixed on one of said shafts for simultaneously moving said cut-off tool and swaging punch with respect to said die to cut off a piece of hot metal from stock, force it into said die, move said swaging punch to expand the piece of metal in said die and almost pass therethrough, but leaving a thin web of metal therein, a crowner mounted in said frame to reciprocate into and out of said die and disposed on the other side of said die from the cut-off tool, a piercer mounted to reciprocate coaxially in said crowner, and cams mounted on the other shaft to cause said crowner and piercer to enter said die, said cams being so proportioned and arranged as to cause the crowner and piercer to remain stationary while the swaging punch expands the piece of metal therein, and to then cause the piercer to remove the thin web from the piece of metal and carry it into the crowning tool following the return movement of the swaging punch.

9. A nut machine comprising a frame, a die box mounted in said frame, a pair of shafts mounted one on either side of said box, a gear wheel on each shaft, gearing for turning said gear wheels simultaneously, tool operating cams on each shaft, cut-off and swaging tools mounted for reciprocation into and out of said box coaxially with one another, a crowner and a piercer mounted for reciprocation into and out of said box at the other side thereof coaxially with one another, means connecting said cut-off and swaging tools with the cams on one shaft for operating them as desired, and means connecting the crowner and piercer with the cams on the other shaft for operating them as desired for manufacturing nut blanks, the proportion and relation of the cams and their connections being such that the crowner is positively retained in place and prevented from movement outwardly of the die box during the blank forming movements of the cut-off and swaging tools.

10. The method of forming nut blanks comprising taking a rectangular bar, the width of which corresponds with that of the nut blanks to be formed, but the thickness of which is somewhat less than that of said blanks, manually feeding said bar to a position where an end portion is between a cut-off tool and a die box, advancing the cut-off tool to cut off a piece from the end of said bar the length of which is equal to the width of a nut blank, moving said cut-off tool further to force said piece into said die box, closing the other end of said box by a crowner and a piercing tool therein, advancing a swaging tool in said cut-off tool, into said piece forming a hole approximately two-thirds of the way therethrough, causing the displaced metal to expand the blank to fill the die box, starting to withdraw the swaging tool and then simultaneously advancing said piercing tool, while the piece is held tight between the crowner and cut-off tool, to complete the hole through the blank by punching out the metal defining the end of the hole formed by the swaging tool and delivering it into the cut-off tool and, while the piercing tool is extended through the nut blank to maintain the correct size of hole, advancing the cut-off tool a slight distance to form the blank to its finished size, withdrawing the piercing and cut-off tools, moving the crowner to eject the nut blank from the die box, and causing relative movement of the swaging and cut-off tools to eject the punching from the latter.

11. The method of forming nut blanks comprising manually feeding a rectangular bar to a die box and associated cut-off tool, cutting off a piece from said bar corresponding with said die box, moving said cut-off tool further to force said piece into said die box, closing the other end of said die box by a crowner and a piercing tool therein, causing a swaging tool and said piercing tool to approach one another, without rotation, forming a hole in said piece substantially more than half way therethrough, causing the displaced metal to expand the blank to fill the die box, starting to withdraw the swaging tool, and then simultaneously advancing said piercing tool, while the piece is held tight between the crowner and cut-off tool, to complete the hole through the blank by punching out the metal still closing the hole formed and delivering it to the cut-off tool, withdrawing the piercing tool, moving the crowner to eject the nut blank from the die box, and causing relative movement of the swaging and cut-off tools to eject the punching from the latter.

12. The method of forming nut blanks comprising taking a rectangular bar the width of which corresponds with that of the blanks to be formed but the thickness of which is somewhat less than that of said blanks, heating said bar and manually feeding it to a position between a die box and associated cut-off tool, advancing said cut-off tool to cut off a piece from the end of said bar, the length of which is equal to the width of a nut blank, moving said cut-off tool further to force said piece into said die box, closing the other end of said box by a crowner and a piercing tool therein, advancing a swaging tool in said cut-off tool, into said piece forming a hole approximately two-thirds of the way therethrough, forcing the displaced metal to expand the blank to fill the die box, starting to withdraw the swaging tool and then simultaneously advancing said piercing tool to complete the hole through the blank by punching out the metal defining the end of the hole formed by the swaging tool and delivering it to the cut-off tool, while the piece is held tight between the crowner and cut-off tool, advancing the cut-off tool a slight distance to form the blank to finished size, withdrawing the piercing tool from the crowner, moving the crowner to eject the nut blank from the die box and simultaneously admitting a stream of tool cooling water through said crowner, and causing relative movement of the swaging and cut-off tools to eject the punching from the latter.

13. The method of forming nut blanks comprising heating a bar, feeding said bar to a position where an end portion is between a cut-off tool and a die box, advancing the cut-off tool to cut off a piece from said bar, moving said cut-off tool further to force said piece into said box, closing the other end of said box by a crowner and a piercing tool therein, advancing a swaging tool in said cut-off tool, into said piece, forming a hole more than one-half of the way therethrough, causing the displaced metal to expand the blank in the box, starting to withdraw the swaging tool and then advancing said piercing tool while the piece is held between the crowner and cut-off tool, to complete the hole through the blank by punching out the metal defining the end of said hole formed by the swaging tool and delivering it into said cut-off tool, advancing the cut-off tool a slight distance to form the blank to its finished size while the piercing tool is extended through said blank, withdrawing the piercing and cut-off tools, advancing the crowner to eject the nut blank from the die box, and causing relative movement of the swaging and cut-off tools to eject the punching from the latter.

WILLIAM E. SHARP.